United States Patent
Kappel et al.

(10) Patent No.: US 11,972,542 B2
(45) Date of Patent: Apr. 30, 2024

(54) OPTICAL CORRECTION VIA MACHINE LEARNING

(71) Applicant: Leica Microsystems CMS GmbH, Wetzlar (DE)

(72) Inventors: Constantin Kappel, Schriesheim (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 274 days.

(21) Appl. No.: 17/414,390

(22) PCT Filed: Dec. 11, 2019

(86) PCT No.: PCT/EP2019/084553
§ 371 (c)(1),
(2) Date: Jun. 16, 2021

(87) PCT Pub. No.: WO2020/126720
PCT Pub. Date: Jun. 25, 2020

(65) Prior Publication Data
US 2022/0051373 A1    Feb. 17, 2022

(30) Foreign Application Priority Data
Dec. 18, 2018    (DE) .................. 10 2018 222 147.2

(51) Int. Cl.
*G06T 5/00* (2006.01)
*G06N 3/08* (2023.01)
(Continued)

(52) U.S. Cl.
CPC .............. *G06T 5/006* (2013.01); *G06N 3/08* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS

2018/0061020 A1    3/2018 Hiasa
2018/0158175 A1*   6/2018 Shmunk ............... G06T 5/20
(Continued)

FOREIGN PATENT DOCUMENTS

CN    107730469 A  *  2/2018
CN    108550125 A  *  9/2018  ............... G06T 3/40
(Continued)

OTHER PUBLICATIONS

M. Bauer, V. Volchkov, M. Hirsch and B. Schcölkopf, "Automatic estimation of modulation transfer functions," 2018 IEEE International Conference on Computational Photography (ICCP), Pittsburgh, PA, USA, 2018, pp. 1-12, doi: 10.1109/ICCPHOT.2018.8368467.*

(Continued)

*Primary Examiner* — Jiangeng Sun
(74) *Attorney, Agent, or Firm* — Leydig, Voit & Mayer, Ltd.

(57) ABSTRACT

A method for determining a neural network for correcting optical aberrations includes determining one or more images that are at least partly related to an optical system or the design of an optical system. A neural network is determined on the basis of the determined one or more images in such a way that the determined neural network when applied to an image captured by the optical system outputs an image which has been corrected in relation to one or more optical aberrations.

22 Claims, 4 Drawing Sheets

(51) Int. Cl.
*G06T 5/20* (2006.01)
*G06T 5/50* (2006.01)

(52) U.S. Cl.
CPC .............. *G06T 2207/20081* (2013.01); *G06T 2207/20084* (2013.01)

(56) References Cited

U.S. PATENT DOCUMENTS

| | | | |
|---|---|---|---|
| 2018/0174046 A1* | 6/2018 | Xiao | G06F 18/24133 |
| 2018/0336662 A1 | 11/2018 | Kimura | |
| 2019/0122378 A1* | 4/2019 | Aswin | G06N 3/045 |

FOREIGN PATENT DOCUMENTS

| | | |
|---|---|---|
| JP | 2018-195069 A | 12/2018 |
| JP | 2020-061129 A | 4/2020 |
| WO | WO 2018037521 A1 | 3/2018 |

OTHER PUBLICATIONS

Wang, Hongda et al: Deep learning achieves super-resolution in fluorescence microscopy, bioRxiv, US, Apr. 27, 2018 (Apr. 27, 2018), XP055617997, pp. 1-30.

Zhang, Hao et al. "High-throughput, high-resolution registration-free generative adversarial network microscopy", Arxiv.org, Cornell University Library, 201 Olin Library Cornell University Ithaca, NY 14853, Jan. 7, 2018 (Jan. 7, 2018), XP081420255, pp. 1-22.

Ignatov, Andrey et al. "DSLR-Quality Photos on Mobile Devices with Deep Convolutional Networks," pp. 3277-3285, ICCV, Oct. 22-29, 2017, Italy.

Zhou, Tianyang et al. "Deep learning for super-resolution localization microscopy," Proceedings of SPIE, vol. 10820, Optics in Health Care and Biomedical Optics VIII, Oct. 23, 2018, pp. 1-8.

* cited by examiner

OPTICAL CORRECTION VIA MACHINE LEARNING

CROSS REFERENCE TO RELATED APPLICATIONS

This application is a U.S. National Phase application under 35 U.S.C. § 371 of International Application No. PCT/EP2019/084553, filed on Dec. 11, 2019, and claims benefit to German Patent Application No. DE 10 2018 222 147.2, filed on Dec. 18, 2018. The International Application was published in German on Jun. 25, 2020, as WO 2020/126720 A1 under PCT Article 21(2).

FIELD

The invention relates to a method and an apparatus for determining a neural network for correcting optical aberrations. An optical system can be configured to be an optical transfer function (OTF), in the sense that a waveform that leaves the optical system at the output differs from that at the input of the optical system. Some of these changes are undesirable and lead to known optical aberrations, such as aberrations, astigmatism, vignetting, and/or coma. Optical aberrations can be related to the production and functionality of optical systems, such as objectives or individual lenses. These optical aberrations can impair the quality of images to such an extent that certain information is not directly visible in the images.

BACKGROUND

The prior art discloses various methods for correcting optical aberrations. One option from the prior art for avoiding these optical aberrations lies in the optimization of the optical systems during the production thereof. By way of example, tempering (coating) of the lenses can lead to the reduction of chromatic aberrations or the use of certain glasses or minerals with strictly defined physical properties can reduce optical aberrations. Alternatively, the use of additional optical components in certain configurations can cause an improvement in the optical properties of an optical system.

However, this method from the prior art exhibits quite a few disadvantages and problems, which are considered below. Optical aberrations can be reduced by the use of higher quality materials or by the use of further optical elements in an optical system but cannot be completely avoided. By way of example, the correction of artifacts in objectives can reduce towards the edge. Defining the numerical aperture and field of view of an objective is somewhat in the judgment of the developers and depends on the drop of certain quality parameters and the expected manufacturing tolerances. However, optical aberrations connected to the manufacturing tolerances cannot be rectified by an optimization of the optical units. Consequently, only very small manufacturing tolerances can be allowed for high quality objectives. Moreover, high costs (material costs or costs of additional components) may arise as a result of this method for reducing aberrations.

Another option for correcting optical aberrations lies in further processing of an image captured by an image recording system by means of electronic data processing. Typically, artifacts are corrected using mathematical models. Here, the individual constituent parts of the error can be described by means of Zernike polynomials. Artifacts are decomposed into components such as spherical aberrations, chromatic aberrations, astigmatism, coma, etc., which in turn are associated with certain Zernike polynomials. If the image of a point source is now recorded by means of an objective, hence allowing the point spread function (PSF) of the objective to be determined, a comparison of the measured point image with the ideal point image allows deduction of the contributions of the individual artifacts, and hence the amplitudes of the Zernike polynomials. However, an accurate determination of the PSF of the objective is required in this case. This is not always possible or sometimes also too inaccurate.

Other methods, such as the vignetting correction or deconvolution, can also be used to correct optical errors. In the case of existing methods for correcting vignetting, a reference image with a homogeneous sample is recorded as a rule, said reference image subsequently being combined by calculation with the recorded image of the sample using a linear method. However, a disadvantage of this method is that it only acts on a sample plane and ignores other errors connected to the vignetting.

A disadvantage of these mathematical methods from the prior art for correcting aberrations is that the mathematical methods cannot be applied, or can only be applied to a restricted extent, to old data recorded by means of unknown objectives as these methods rely on measurements of certain samples or a measurement of the objective and the optical properties thereof. Therefore, these methods from the prior art are not applicable to old data (images) recorded by means of unknown objectives, or supply inaccurate results.

SUMMARY

In an embodiment, the present disclosure provides a method for determining a neural network for correcting optical aberrations. The method includes determining one or more images, wherein the one or more images are at least partly related to an optical system or the design of an optical system. A neural network is determined on the basis of the determined one or more images in such a way that the determined neural network when applied to an image captured by the optical system outputs an image which has been corrected in relation to one or more optical aberrations.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
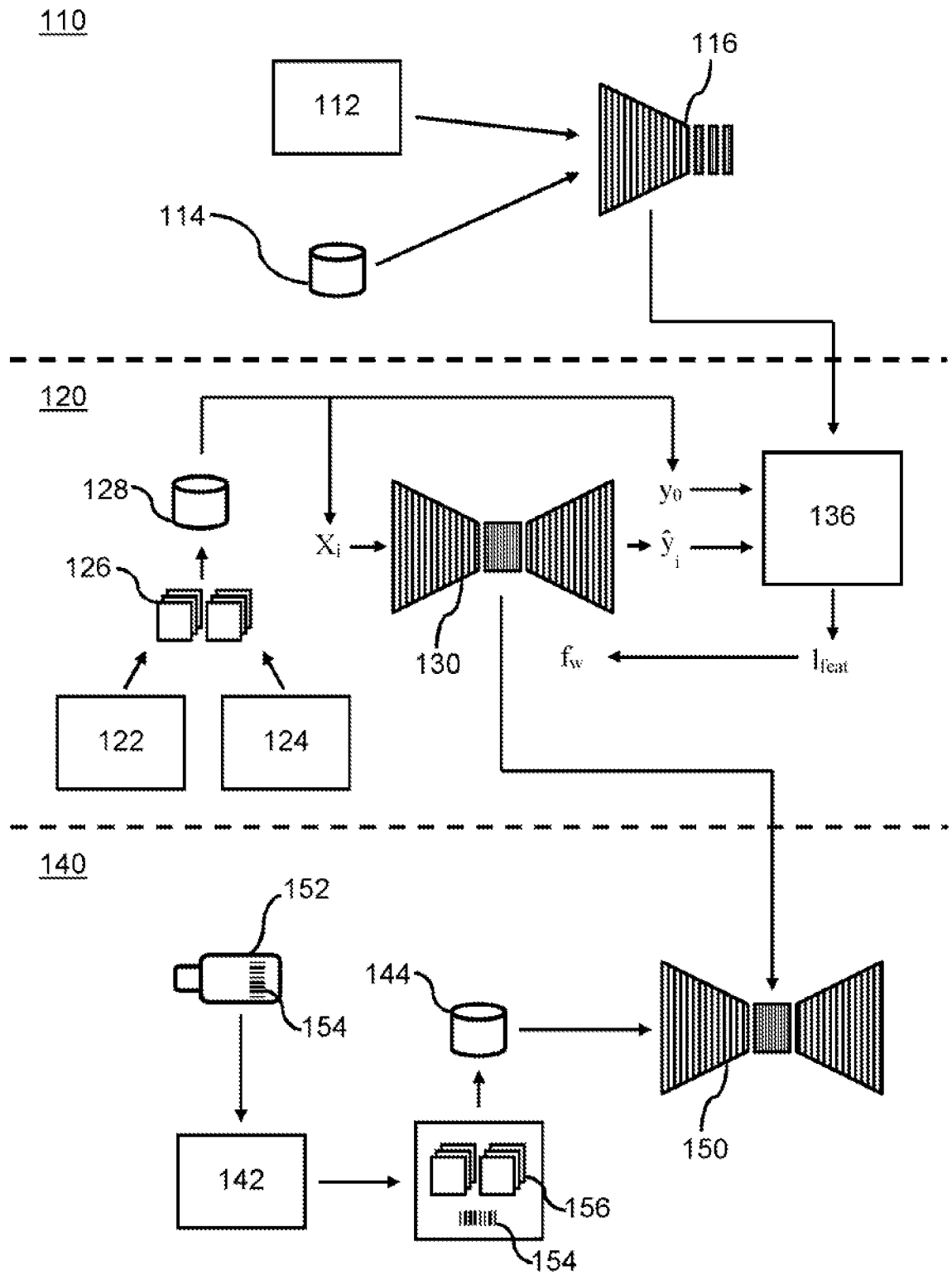
FIG. 1 shows a schematic illustration of a method according to the invention for determining a neural network for correcting optical aberrations according to one embodiment.

Embodiments of the present invention consequently provide improved means for correcting optical aberrations.

In an embodiment, the present invention solves the aforementioned problems and provides improved means for correcting optical aberrations by way of a method for determining a neural network for correcting optical aberrations. The method comprises the steps of determining one or more images, wherein the one or more images are at least partly related to an optical system or the design of an optical system, and of determining a neural network on the basis of the determined one or more images, in such a way that the determined neural network when applied to an image captured by means of the optical system outputs an image which has been corrected in relation to one or more optical aberrations.

The apparatus according to an embodiment of the invention comprises one or more processors and one or more computer-readable storage media, wherein computer-executable instructions are stored on the one or more computer-readable storage media, said instructions, when executed by the one or more processors, cause one or more images to be captured by means of an imaging and/or image recording system, wherein one or more optical aberrations in the one or more captured images are related to at least one part of the imaging and/or image recording system, and a neural network to be applied to the one or more captured images, wherein the neural network is configured to generate one or more appropriately corrected images from the one or more captured images, in such a way that the one or more optical aberrations are corrected or reduced in the one or more corrected images.

The method according to the invention and the apparatus according to the invention are advantageous in that neural networks, for example within the meaning of deep learning, are determined or applied for the purposes of correcting optical aberrations. This allows the imaging power of existing optical systems to be improved. Moreover, the method according to the invention and the apparatus according to the invention allow costs to be saved during the production of optical systems. The production costs of optical systems, such as high power systems, depend significantly on what measures have to be taken to avoid optical aberrations (such as the selection of the materials, the application of coatings, or the insertion of further lenses and lens groups). A further factor deciding costs during the production of optical systems is the admissible variance of the optical units. The method according to the invention allows greater tolerances for the variance of optical parameters. As a result, costs can be saved. By determining neural networks for correcting optical aberrations, it is possible, for example, to omit certain production steps during the production of optical systems, to use more cost-effective materials, and/or to carry out simplifications in respect of the optical design (e.g., by the omission of lenses). As a result, image recording systems or optical systems that operate in combination with a neural network for correcting optical aberrations can be produced more cost-effectively. Moreover, neural networks facilitate a better generalizability for previously unknown applications.

A further advantage of the method according to the invention and of the apparatus according to the invention is that optical systems can be adapted in such a way that their field of use can be expanded without adversely affecting the image quality. By way of example, lesser requirements can be placed on certain parameters of optical systems, leading to an increase in the degrees of freedom in other optical properties and opening up new fields of application. By way of example, maximum planarity and maximum working distance exclude one another. If optical errors linked to the planarity of an optical system can be neglected as a result of determining a neural network for the purposes of correcting these errors, a greater working distance is possible and hence more flexibility when choosing the sample. Moreover, the method according to the invention can provide means for simultaneous correction of a plurality of optical errors, including nonlinear optical errors.

The method according to the invention and the apparatus according to the invention can each be improved further by way of specific configurations. Individual technical features of the configurations of the invention described below can be combined with one another and/or omitted as desired, provided the technical effect obtained by the omitted technical feature does not matter.

In one embodiment, determining the neural network comprises training of the neural network. Determining the one or more images can comprise a determination of training images, with the training of the neural network comprising a training using training images which comprise a multiplicity of image pairs. Each image pair of the multiplicity of image pairs for the training can respectively comprise an input image for the neural network and a target output image. This facilitates the correction of aberrations in old data recorded with unknown objectives and is rendered possible by virtue of the neural network having learnt to correct optical aberrations on the basis of training data, which are related to an optical system or its design. Thus, it is not mandatory in the individual case to carry out reference measurements for each existing objective since the neural network learns how image data and image content should look. Conventional methods are not able to do this.

In embodiments, the training images can be generated from captured images which image one or more sample types, for example, wherein the captured images were captured by means of one or more optical systems and/or using the optical system, and wherein none, a subset, or all of the one or more optical systems have the same design as the optical system. In further embodiments, which can be combined with the preceding embodiments, the training images can be generated by a simulation of optical aberrations. For the simulation, it is possible to determine an optical transfer function (OTF) or a point spread function (PSF) for the optical system or for a design of optical systems. Alternatively, the OTF or PSF can also be determined independently of the simulation. With the aid of the PSF or the OTF, which can be converted into one another, it is possible to generate input images of the multiplicity of image pairs by convolving error-free images with the PSF. This allows the generation of virtually "perfect" training data (image pairs) since the error-free images can be used as corresponding target output images of the multiplicity of image pairs. The optical system can be part of an imaging and/or image recording system of a microscope, a microscope system, a camera, a smartphone, a telescope, a computer, which can advantageously also be portable, or a measuring appliance, and can comprise one or more optical components (e.g., lenses, mirrors, and/or other optical units).

In one embodiment, a further (second) neural network can be applied for the purposes of training the neural network (also referred to as first neural network below). The further neural network can be applied as loss function for training of the first neural network. This facilitates improved training of the first neural network since a neural network as a loss function facilitates an accurate training which ensures that the output of the neural network equals a desired image. This is not ensured if an error in the output image is only calculated per pixel. Consequently, the output images are not treated as a set of independent pixels but are put into a semantic relationship.

In advantageous embodiments, the determined neural network can be trained further (finely adjusted). This fine adjustment (also referred to as fine tuning below) can comprise training of only a part of the determined (first) neural network. In the process, one or more parameters of the determined neural network can remain unchangeable during the fine adjustment. Moreover, the fine adjustment can comprise training specific to the optical system. Consequently, the neural network can be adapted to correct aberrations specific to the optical system. The finely adjusted neural network can be uniquely assigned to the optical system. The fine adjustment can be carried out on the basis of individual training data. The individual training data can be generated on the basis of optical properties and/or measurement samples which are related to the optical system. The optical properties of the optical system can be determined in one step and/or the measurement samples can be captured by means of the optical system. At least one of the measurement samples, the optical properties, and the individual training data can be stored, for example in a database, wherein the measurement samples, the optical properties, and/or the individual training data are uniquely assigned to the optical system.

In configurations of the method according to the invention, the optical system can be uniquely and/or automatically identifiable. The first neural network, and the adapted/finely adjusted neural network, can be assigned uniquely to the optical system. By way of example, the optical system can be identifiable by means of electromagnetic identification, optical identification, mechanical identification, or magnetic identification.

In one configuration, which is combinable with the preceding configurations, the method according to the invention for correcting optical aberrations comprises applying the determined neural network or the finely adjusted neural network to captured data. The captured data (e.g., images) could have been captured by means of the optical system or an optical system of the same type (and a photodetector or, in the case of scanning systems, with a point photodetector). The optical aberrations can comprise astigmatism, vignetting, coma, chromatic aberration, spherical aberration, or defocusing.

In embodiments, determining the neural network can comprise training the neural network on the basis of the one or more determined images, wherein the neural network learns during the training how objects and/or structures in the one or more images ideally look and corrects deviations therefrom. This facilitates the correction of aberrations if the OTF is not accurately known. In this case, the neural network can automatically identify the type of error present and the type of object imaged in a captured image. In this case, neither the type of error nor the object type needs to be specified explicitly. The neural network is trained to convert objects in the captured image into a corrected image, in such a way that the object is correctly reconstructed "implicitly", i.e., as part of the learned parameters, in the network. A precondition for this is that the neural network has seen similar objects during training. In this case, similar means that the same image features are present both in the training images and in the images to be corrected, i.e., the training images are contextualized with the captured images.

In one embodiment, the apparatus according to the invention is configured to store the one or more captured images and to apply the neural network to the one or more stored captured images. Alternatively, the neural network can be applied directly to the one or more captured images and only the one or more corrected images are stored. Consequently, correction of the optical aberrations can already be implemented during the recording of the images ("in real time"), i.e., before the image is stored, or only after said image has already been stored. The at least one part of the imaging and/or image recording system can comprise an optical system, a photographic layer, an sCMOS or CCD sensor, or one or more diffusion panels.

The present subject matter of embodiments of the invention is described in more detail below on the basis of exemplary drawings. The drawings show examples of advantageous configurations of the invention.

FIG. 1 shows a schematic illustration of a method for determining a neural network 130. The neural network 130 for correcting optical aberrations, also referred to as "correction network" below, can be determined and/or trained in a plurality of steps 110 and 120. Additionally, the determined neural network 130 can be finely adjusted in a further training step 140. The neural network 130 for correcting artifacts can comprise, for example, an autoencoder, a U-Net or a "generative adversarial network" (GAN) and it is configured to output images. The neural network 130 is part of the class of "convolutional neural networks", which are also referred to CNNs.

Training steps 120 and/or 140 can be prepared in a first step 110, which is optional. One possible preparation of the training comprises the determination of a loss function 136 for the training in training step 120. By way of example, a second neural network 116 can be determined or trained, and can be used at least in part as a basis for the loss function 136. By way of example, the second neural network 116 or parts of the second neural network 116, preferably the part of the second neural network 116 which extracts image parameters or image properties, can serve for the training of the neural network 130 as a loss function 136 or else as a target function. In this case, the loss function 136 is a loss network.

This second neural network 116, also referred to as "master model" below, can be selected from a multiplicity of neural networks stored in a data memory 114 and need not be a neural network that outputs images itself. By way of example, the master model 116 can be a pre-trained neural network which solves a classification problem.

Alternatively, the master model can also be found or determined by means of machine learning within the scope of so-called "training" 112. The master model can be trained on the basis of a multiplicity of samples from different fields of application (e.g., single-cell culture, three-dimensional cell culture, tissue sections, organoids, spheroids, native organs, or living organisms). In the process, so-called "supervised training" can be used. For the training, use can be made of a scenario in which the model solves a classification problem, for example, i.e., does not output any images itself. The master model can be trained in a context which is related to the subsequent field of use of the neural network 130. By way of example, the master model can be trained using a data record of microscope images.

The master model can be used as "feature extractor" in order to calculate so-called "activations". The activations indicate which "neurons" respond to certain image components (features), i.e., have recognized, e.g., faces or (in the context of microscopy) cell organelles. In aggregated form, the activations of all neurons of the entire master model or of a part of the master model can be considered to be a measure for the "image-like property" and hence the correctness of the corrected image, and can therefore be used as a loss function.

In embodiments, the master model or parts of the master model can be used to make a prediction using the neural network 130 or to accelerate the convergence of the neural network 130 by way of "transfer learning".

The correction network 130 can be embodied to convert input images $X_i$ into output images $\hat{y}_i$ or to map input images $X_i$ onto output images $\hat{y}_i$. The loss function 136 can output a numerical measure $l_{feat}$ as to how well prediction $\hat{y}_i$ of the correction network 130 and target output image $y_0$ (an error-free image) correspond. The variables $X_i$, $\hat{y}_i$ and $y_0$ are vectors or matrices, the elements of which are assigned to the pixels of images. The correction network 130 to be trained and the loss function 136 form a system for training the correction network 130.

A loss network or loss function can be used to define one or more loss functions which measure perceptual differences in relation to the content between images, output images $\hat{y}_i$, and the corresponding target output image $y_0$. The loss network is not altered or trained during the training of the correction network 130.

In embodiments, the correction network 130 can be a neural network, for example a "residual convolutional neural network", which is parameterized by weights W. The correction network 130 converts input images $X_i$ into output images $\hat{y}_i$ by way of the mapping $\hat{y}_i$,$f_w(X_i)$. Each loss function of the one or more loss functions can calculate a scalar value which represents the difference between the output image $\hat{y}_i$ and the target output image or the target image $y_0$. The correction network can be trained using deep learning processes. By way of example, the correction network can be trained by means of stochastic gradient descent in order to minimize a weighted combination of loss functions 136. By way of example, the weights W are adjusted in such a way that a feature restoration loss $l_{feat}$ is minimal.

Loss functions based on a per pixel loss are susceptible to errors and may supply imprecise results for training. In order to counteract these disadvantages, loss functions which determine perceptual differences and semantic differences between images can be used in embodiments. A master model 116 which was trained for image classification already has the property of expressing features or semantic information of the input images in hidden representations or features. These hidden representations can be used to make a statement about the similarity of images. Consequently, a neural network 116 can define a loss function 136, in which hidden representations, and hence semantic information, are compared with one another. The loss network 136 can define a feature restoration loss heat, which indicates a measure for the differences in the content of the images between the target output image $y_0$ and the output image $\hat{y}_i$ of the correction network 130.

Consequently, a perceptual loss can be determined by means of the loss network 136. Hence, with the aid of the loss network 136, it is possible to ensure that the output $\hat{y}_i$ of the neural network 130 looks like an image to be expected. This is not a given in the case of loss functions that only calculate an error per pixel of an image. Consequently, the output images $\hat{y}_i$ are not treated as a set of independent pixels but are put into a semantic relationship.

A training data record is generated in embodiments. The training data record can comprise image pairs 126 (training images), with the image pairs 126 being distinguished by virtue of one image of an image pair being an input image $X_i$ for the neural network 130 and the other image of the image pair corresponding to a target output image $y_0$ of the neural network 130. The input image $X_i$ can be considered to be an error-afflicted image or measured or captured image, and the target output image $y_0$ can be considered to be a desired error-free or corrected image. On the basis of the image pairs 126 and, in particular, on the target output images, it is possible to train the neural network 130 to correct one or more aberrations of the multiplicity of possible aberrations. The image pairs 126 can be used to train a neural network which corrects aberrations that are present in the input image and are missing or attenuated in the target output image. As an alternative or in addition thereto, the training data record for training the neural network 130 can comprise further data. The further data can comprise at least one of the following: parameter data which are related to the image pairs 126 or training images, validation data, measurement data related to a production of an optical system, data relating to the progress of an experiment or a measurement, information relating to reagents and materials, information relating to an object or sample, information relating to an optical system, user-related data, user inputs, and information relating to an image capture system.

The training data record can be generated with the aid of various methods, or else from combinations of these methods. In FIG. 1, a distinction is made between two steps 122 and 124 for producing training data, which are combinable. The training data can be produced artificially in a step 122. By way of example, aberrations can be produced artificially by image processing. In step 124, the training data can be generated from measured or captured data, wherein the measured or captured data are captured by means of one or more optical systems and the optical aberrations are produced by the one or more optical systems. The generated training data can be stored in the data memory 128. Some possible methods for producing training data are described in more detail below.

A first method (zoom in strategy) for generating training data for the training of neural networks is based on recording images of homogeneous samples by means of one or more optical systems. Images with different zoom settings are generated from these homogeneous samples. By way of example, first recordings of a homogeneous sample are generated with a maximum zoom of an optical system and second recordings are generated with a minimum zoom of the same optical system. The (almost) error-free image can be created in the case of the recording with a maximum or a large zoom in the center of a homogeneous sample, and the error-afflicted image can be created in the case of minimal or a small zoom. What is exploited in this method is that some aberrations have a less pronounced effect in the image center than at the edge.

A second method (displacement strategy) for producing training data renders it possible to generate image pairs 126 from recordings of homogeneous and of structured samples. Like in the first method, this method also exploits the fact that certain optical aberrations have a weaker effect in the image center than at the image edge. In this second method, at least one image is recorded with any zoom, for example a mid zoom or a high zoom. The target output image is generated from the image center of a recorded image of the at least one recorded image and the input image is generated from the recorded image at a defined position at the edge or in a corner of the recorded image. The image pairs 126 for the training data record can comprise many different defined positions and/or different zooms. To create the training data record, it is possible to implement recordings of one or more homogeneous and/or structured samples using one or more optical systems of one or more types.

A third method (simulation strategy) for generating training data is based on the simulation of optical aberrations. If the optical transfer function (OTF), which is the same as a Fourier transform of the point spread function (PSF) of an optical system, or the PSF of an optical system is known, or if it can be measured or simulated, it is possible to artificially generate image pairs 126. An error-free image, which can serve as a target output image, can be transformed into an error-afflicted image, which can serve as an input image, by way of a mathematical method, for example the convolution of the error-free image with the PSF of an optical system.

The training data record can be created using a multiplicity of optical systems, e.g., a multiplicity of objectives, of different designs. This can comprise all optical systems or all types of optical systems, in the context of which a neural network trained using these training data as is used. By way of example, training data can be generated by means of various objectives and a neural network can be trained by means of these training data. This neural network can be used to correct aberrations in measurement images captured by one or more of the various objectives.

The training data record can be stored in a cloud, in a data memory 128, on a computer such as a workstation computer, or on a server suitable for training neural networks. The server or the computer is then able to carry out the training and store the results from the training again (e.g., in the data memory 128 or in a different memory).

The neural networks can be trained using deep learning processes. This comprises an orderly application of at least one deep learning method, but preferably a plurality of deep learning methods, in order to achieve a certain target. In this case, the target can comprise the image processing (e.g., correction of one or more optical errors, generation of an image from another image, wherein at least one feature in the images is different, etc.). Deep learning methods can comprise a sequence of method steps which subdivide a procedure into comprehensible steps, to be precise in such a way that this procedure is rendered repeatable. The method steps can be certain deep learning algorithms. However, these can also be processes by means of which a network learns (e.g., back propagation); for example, this can be the way in which data is collected or the way in which data are processed by way of hardware, etc.

The training data record which was generated as per one or more of the above-described methods or which was made available by third parties can be used for training the neural network 130. In one embodiment, the target for the training is that of generating a neural network 130 which transforms input images, for example images captured by an optical system, into corrected images, wherein the transformed images correct or reduce at least one aberration that arose in the input images as a result of the optical system. This means that the image quality, such as the contrast or the sharpness, has been increased in (one or more regions of) the output image in relation to the input image. In the ideal case, error-free images can be generated from error-afflicted images.

In a further phase 140, the so-called "fine tuning", the correction network 130 can be optimized further. As a rule, optical systems are produced with certain tolerances during the manufacture thereof. Therefore, optical systems produced by the same manufacturing process can have deviations from one another within the range of the manufacturing tolerances. These deviations can have an effect on the optical aberrations arising as a result of the optical systems. Optical systems of the same design can therefore be related to different OTFs.

To compensate these tolerances from manufacturing, properties of optical systems can be determined in a step 142. By way of example, the optical properties can be measured by an individual optical system 152. Measuring the optical system 152 can comprise capturing one or more measurement samples. These measurement samples and/or the properties of the optical system can be stored in a data memory 144. In embodiments, determining the properties of an optical system 152 comprises determining an OTF and/or PSF for this produced optical system 152. The data record with the measurement samples and/or the properties of the optical system can be available over the entire life cycle of the optical system. In one embodiment, the data record with the measurement samples and/or the properties of the optical system can be stored in a cloud.

To be able to assign the measurement samples and/or the properties of an optical system 152, such as an objective, to the optical system 152, the data which comprise the measurement samples and/or the properties of the optical system are assigned to a label 154 of the optical system and can be stored on the basis of this label 154 or together with an identification number corresponding to the label 154. The optical system 152 can obtain its label 154 during the production, wherein the label 152 can be attached in a manner unique to each optical system and permanently on the optical system 152. By way of example, the label 154 can comprise an optical code (such as, e.g., a barcode, a quick response code, a characteristic, or a certain color), a code of one or more threads and/or one or more mechanical parts, a certain shape, a certain weight, a sound strip, a relief stamp, a radiofrequency transponder, a magnetic strip chip card or magnetic color.

Consequently, the optical system 152 can be identified by means of electromagnetic identification, optical identification, mechanical identification, magnetic identification, or a combination thereof.

Training data 156 can be generated on the basis of the measurement samples and/or the optical properties. These training data can be generated like the training data, wherein the training data 156 are related only or specifically to the optical system 152. The training data 156 can be generated on the basis of the measurement samples, which can contain the images recorded by the optical system 152 or on the basis of a simulation by means of the OTF or the associated PSF of the optical system 152.

Since the measurement sample and the optical properties of an optical system can be assigned to this optical system 152, the training data 156 can also be assigned to this optical system 152. Therefore, the training data 156 can be stored on the basis of the label 154. As indicated in FIG. 1, these data 156 can be stored on the basis of the label 154 in data memory 144. In exemplary embodiments, one or more of the data memories 114, 128 and 144 can be identical. By way of example, all training steps 110, 120 and 130 can be carried out at a producer of the optical system 152. Alternatively, individual training steps 110, 120 and 130, such as the fine tuning 130, can be carried out at the user of the optical system 152.

The data record with the measurement samples and/or the properties of the optical system 152 or the data record with the training data 156 associated with an optical system can be accessed on the basis of the label 154 of the optical system 152 or the identification number that corresponds to the label 154. In embodiments, these data records can be stored on a server of the manufacturer or in a cloud. By way of example, a user can access these data records with the aid of credentials, such as a username and password or the identification number of the optical system 152.

In the training step 140, the neural network 130 from the training step 120 can be finely adjusted. Below, the fine tuning is described in exemplary fashion on the basis of the neural network 130. However, alternatively, neural networks from other sources, such as a user of a neural network, can continue to be finely adjusted.

Fine tuning relates to adapting a previously trained neural network, which is already able to identify essential image features, to a new, unknown data record. A neural network such as the neural network 130 can be pre-trained in such a way that certain artifacts are corrected. To this end, use can be made of a data record that is as comprehensive as possible. For a specific optical unit or a specific optical system, for example a certain objective, the prediction accuracy, i.e., the image quality of the output images, could then be improved by means of fine tuning by virtue of a (smaller) training data record 156 being created using this objective and the pre-trained network 130 being "finely adjusted", i.e., adapted. This type of fine tuning can occur at the producer of the optical system. Alternatively, the fine tuning can also occur at the customer or a third party. Fine tuning can be implemented in relation to a certain optical system or one or more certain samples. These one or more certain samples may not have been contained in the original training data record or may have been under-represented, for example. Consequently, the prediction accuracy of a neural network can be improved by fine tuning. During fine tuning, a pre-trained neural network can be trained in relation to new data with a learning rate that has been reduced by 1-2 orders of magnitude. Within this meaning, the "learning rate" is a scaling factor for the numerical optimization, which determines the increment for the change of the learned model parameters. If the latter is large, the model can converge in fewer steps; however, there is also the risk of model parameters moving away from the optimum again. In the case of the fine tuning, the assumption can be made that the pre-trained parameters are already quite close to the optimum. Therefore, the increment or the learning speed can be reduced in comparison with the training in step 120, in order to find the global minimum of the loss function. This can prevent the available "knowledge" of the model, represented by the model parameters, from being destroyed by increments that are too large.

The training data record 156 can be used for fine tuning of the neural network 130. During the fine tuning, an existing neural network, e.g., the neural network 130, is used as the basis for further training. The further training comprises only part of the neural network being trained. In the process, some parameters of the neural network are fixed or unchanging, while the remaining parameters can be influenced or altered by the further training. This facilitates quick training. The further training can be carried out with different learning rates, depending on the position of the parameters in the neural network.

Various deep learning processes can be used for the further training using the training data 156. In embodiments, the neural network 150 is trained with the aid of a second neural network as a loss function. This can be implemented like in the training stop 120 in FIG. 1.

An adapted neural network 150, which is trained specifically for the optical system 152, arises as a result of the further training. Consequently, there can be an individual adaptation of the neural network 150 to the specific optical system 152 (such as, e.g., an objective) while the basic properties of the correction network 130 of being able to correct certain optical errors remain.

The adapted neural network 150 can be stored in conjunction with the label 154 of the optical system 152 or together with an identification number corresponding to the label 154 in a data memory, a server, or a cloud. In embodiments, the adapted neural network 150 is implemented on a server or cloud and brought to bear. The server or the cloud are consequently configured to correct optical aberrations in images with the aid of the adapted neural network 150. By way of example, error-afflicted images can be loaded into the cloud or onto the server. Then, error-free or error-reduced images can be generated and made available with the aid of the adapted neural network 150. The adapted neural network 150 can be accessed on the basis of the label 154 or the corresponding identification number of the optical system 152. By way of example, a user can access the adapted neural network 150 with the aid of credentials, such as a username and password. The user can obtain credentials by purchasing or receiving the optical system. Alternatively, the objective or the optical system 152 can be part of an image recording system and the neural network 150 can be implemented on the image recording system.

Consequently, differences in the range of manufacturing tolerances that occurred during the production of optical systems can be taken into account on an individual basis and the optical performance of the optical system 152 can be improved in the context of an application of the adapted neural network 150 on the images captured by the optical system 152.

In embodiments, the fine tuning can be carried out for a type or design of optical systems, rather than for individual optical systems. In this case, a correction network 130 that was trained on the basis of training data produced by means of different types of optical systems can be finely adjusted, wherein the training data 156 were created in conjunction with the one type of optical system. In this case, the adapted neural network 150 can be stored in conjunction with a label for the type of optical system.

Figure 2:
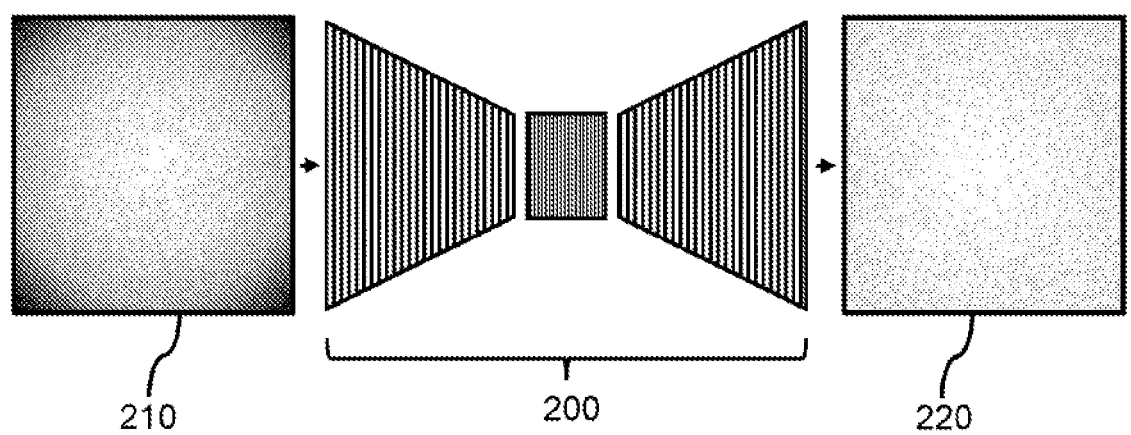
FIG. 2 shows a schematic illustration of a method according to the invention for correcting optical aberrations by means of a neural network according to one embodiment.

FIG. 2 shows a schematic illustration of the functionality of a neural network 200 for correcting optical aberrations. The neural network 200 can comprise the correction network 130 or the adapted neural network 150, which were trained like in FIG. 1. The neural network is configured to reduce or remove optical aberrations from an image 210 by virtue of the neural network 200 generating an error-free or error-reduced image 220. The input image 210 can contain one or more optical aberrations, such as vignetting, for example. As an alternative or in addition thereto, the image 210 can also contain one or more optical aberrations, such as astigmatism, coma, chromatic aberration, spherical aberration, image field curvature, distortion, a Gaussian error or defocusing. Aberrations can be caused due to technical reasons. By way of example, dimensional and shape deviations of the elements (lenses and mirrors) of an optical system, deviations of the elements of the optical systems from their envisaged positions, a deviating refractive index of lenses of the optical system due to production reasons, inhomogeneities (schlieren) in the glass of an optical unit or of the optical system, or inherent stresses of the optical units and stresses as a result of the frame, which may lead to stress-induced birefringence, may be related to aberrations in a captured image.

If the neural network 200 is applied to an error-afflicted image 210 or if this error-afflicted image 210 is input into the neural network, the neural network 200 can generate an output image 220 from the image 210. The one or more optical aberrations can be reduced or eliminated in the output image 220. This can be expressed by virtue of the image quality (e.g., the detail contrast) in the output image 220 or in regions of the output image 220 being greater than in the input image 210 or the corresponding regions of the input image.

The application of the neural network 200 differs from the training of the neural network 200 in terms of the data records used. During training, one or more error-afflicted images are input into the neural network and internal parameters of the neural network are adapted in such a way that the output images of the neural network correspond to the best possible extent to target output images. During the application of the neural network, the image data run through the neural network once, and the neural network generates an output image as a prediction.

Neural networks can represent results, with the latter having been learned by at least one deep learning process and/or at least one deep learning method. These neural networks condense knowledge collected in relation to a specific object ensemble in a suitable manner by automated learning, in such a way that a certain object can henceforth be carried out in automated fashion and with the highest quality.

An imaging and/or image recording system can be configured to capture one or more images, wherein one or more optical aberrations in the one or more captured images are related to at least one part of the imaging and/or image recording system. The one or more images can comprise the image 210 that can be processed by means of the neural network 200. The imaging and/or image recording system can comprise an optical system, such as, e.g., an objective, optical units or individual lenses, a photographic layer, an sCMOS ("scientific complementary metal-oxide-semiconductor") or CCD ("charge-coupled device") sensor, or one or more diffusion panels. In embodiments, the one or more captured images can be stored and the one or more stored images can be input into the neural network 200. Alternatively, the one or more captured images can be input directly into the neural network 200 and only the one or more corrected images are stored.

Figure 3:
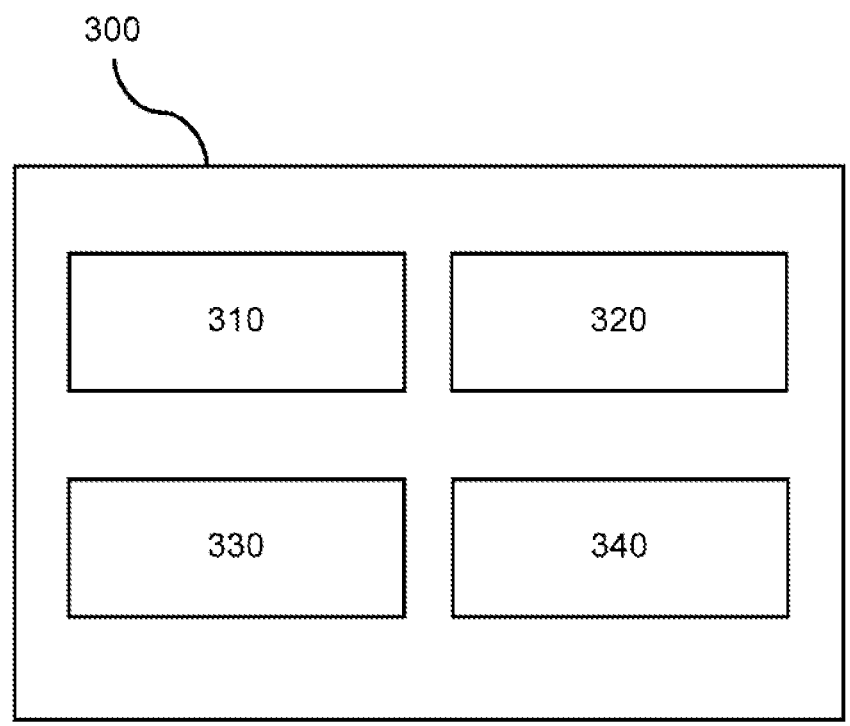
FIG. 3 shows a schematic illustration of an apparatus according to the invention according to one embodiment.

FIG. 3 shows an apparatus 300 which comprises one or more processors 310 and one or more storage media 320. The apparatus 300 can comprise an imaging and/or image recording system. Alternatively, the apparatus 300 can also be spatially separated from an imaging and/or image recording system and can be connected to the imaging and/or image recording system via a network, for example a radio network. In this case, the apparatus can comprise a workstation computer, a server, a microcomputer, a computer, or an embedded computer.

The one or more processors 310 can comprise computing accelerators, such as graphics processing units (GPUs), tensor processing units (TPUs), application-specific integrated circuits (ASICs) specialized for machine learning (ML) and/or deep learning (DL), or field-programmable gate arrays (FPGAs) or at least one central processing unit (CPU). An application-specific integrated circuit (ASIC, also referred to as custom chip) is electronic circuitry that can be realized as an integrated circuit. Since their architecture is adapted to a specific problem, ASICs operate very efficiently and several times faster than a functionally equivalent implementation by software in a microcontroller. Tensor processing units (TPUs), also referred to as tensor processors, are application-specific chips and, in comparison with CPUs, can accelerate applications within the scope of machine learning. This or similar specialized hardware can be used to optimally achieve deep learning objects. The application of a neural network, in particular, which requires orders of magnitude less of computational power than the training, i.e., the development of a model, also operates on conventional CPUs.

Furthermore, in embodiments, the apparatus can comprise one or more neural networks 330. With the aid of the one or more neural networks 330, the apparatus 300 can be rendered capable of correcting or minimizing optical aberrations in images by means of artificial intelligence (AI). The one or more neural networks 330 can be implemented by the one or more processors 310. The implementation of neural networks 330 requires orders of magnitude less of computational power than the training or the development of a neural network.

By the implementation of the neural network 330 on the apparatus 300, the latter obtains additional "intelligence". Thus, the apparatus 30 can be put into a position to independently achieve a desired object. This consequently yields a cognitively extended apparatus 300. Cognitively extended means that the apparatus can be rendered capable of semantically identifying and processing image content or other data by the use of neural networks (or deep learning models) or other machine learning methods.

Furthermore, the apparatus 300 can comprise one or more components 340. By way of example, the one or more components 340 can comprise a user interface and/or an interface to download neural networks on the apparatus 300. In one embodiment, the one or more components 340 comprise an image recording system for capturing images.

In embodiments, the apparatus 300 can be used to train a neural network 330. To this end, the apparatus 300 can comprise an apparatus for determining a neural network for correcting optical aberrations. Computer-implementable instructions stored on the one or more computer-readable storage media 320 can, when executed by the one processor or the plurality of processors 310, cause one of the methods or parts of the method according to FIGS. 1 and/or 4 to be carried out.

Figure 4:
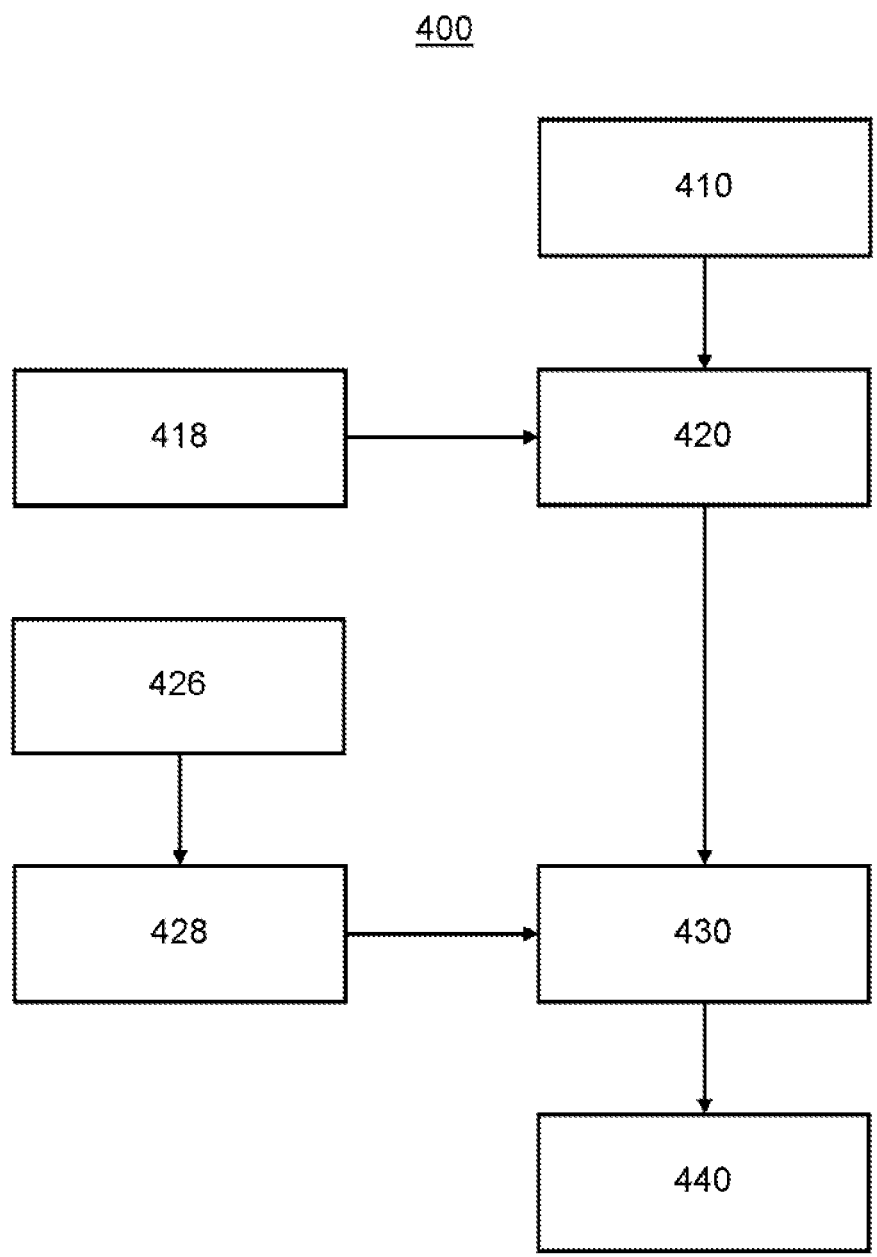
FIG. 4 shows a schematic flowchart of an embodiment of the method according to the invention.

FIG. 4 shows a schematic flowchart according to one exemplary embodiment of a (computer-implemented) method 400 according to the invention for determining a first neural network for correcting optical aberrations. The method 400 comprises a step 418 in which one or more images are determined in order to determine a first neural network on the basis of these images (step 420). Determining 418 the one or more images can comprise determining training images for training a first neural network. Determining the training data or training images can comprise one or more measurements and/or one or more simulations in conjunction with one or more optical systems or types (designs) of optical systems and/or one or more sample types, in order to generate the training data. Alternatively, training data stored in a database or made available by third parties can be determined for the training. The training data comprise one or more image pairs, wherein the image pairs contain error-afflicted input images and error-free or error-reduced target output images.

Training can be prepared in an optional step 410. The training conditions can be defined in step 410. This can comprise determining a second neural network as a loss function for the first neural network (the neural network to be trained). By way of example, this can be implemented by training the second neural network. Alternatively, the determination can comprise selecting the second neural network from a multiplicity of neural networks, wherein the multiplicity of neural networks were trained using different sample types and the second neural network is selected on the basis of the sample type. The second neural network may have been trained or can be trained using a sample type which is related to the subsequent application of the first neural network. The second neural network can be configured to make predictions, such as a classification, for example, on the basis of images as an input value for the second neural network.

In step 420, the first neural network is trained on the basis of the training data from step 418. During the training in step 420, internal parameters (e.g., weights "W" and thresholds "B") of the first neural network are found, which map a multiplicity of input images input into the first neural network on to the target output images in optimal fashion or to the best possible extent. Consequently, the first neural network is able to generate new images from images and solve a problem related to the training data. The first neural network can be trained to remove or reduce one or more optical aberrations in images, in such a way that input images have, e.g., a lower detail contrast or lower sharpness than corresponding output images of the first neural network.

An optical system is determined in a step 426. A label can be assigned to the optical system in order to be able to uniquely identify this optical system. To this end, the optical system can be provided with an individual code. This can be implemented during the production of the optical system.

Individual training data are determined in step 428. In embodiments, determining the individual training data comprises a determination of optical properties of the individual optical system determined in step 426. This can comprise a measurement and/or simulation of the optical system. By way of example, it is possible to determine an optical transfer function OTF for the individual optical system. This can be implemented during or after the production of the optical system. The optical system can be uniquely assigned to the OTF with the aid of the label of the optical system. In this case, the individual training data can be generated on the basis of the optical properties of the optical system for fine tuning. With the knowledge of the OTF, it is possible to generate image pairs as individual training data since the OTF describes the optical aberrations of the associated optical system.

The first neural network which was determined in step 420 can be finely adjusted in a step 430. In this case, the first neural network is trained further in order to obtain an adapted (third) neural network. The adapted neural network can be trained for a specific application. By way of example, the first neural network can be trained further on the basis of the individual training data generated in step 428. Consequently, the adapted (third) neural network can be trained specifically for an individual optical system. Alternatively, the first neural network can also be trained further for a specific application, by virtue of training data of a certain sample type (which have a certain relationship with the determined application) being used for the fine tuning.

During the further training (fine tuning) in step 430, it is possible to use these individual training data in order to further train at least some of the pre-trained (first) neural network. By way of example, it is possible to only alter some of the internal parameters of the neural network on the basis of the further training, wherein the remaining internal parameters cannot be altered by the further training. This facilitates a quick individual adaptation of the neural network to a certain application, such as the correction of optical aberrations in images captured by a certain optical system.

Fine tuning of the neural networks allows these to be continuously improved and/or the field of application of the neural network to be specified. Advantageously, this can be implemented by training of only a few nodes in a neural network. By way of example, a slightly damaged optical system can adversely affect the quality of images captured with this damaged optical system. A fine adjustment and/or training of a neural network according to the method according to the invention allows the determination of a neural network for correcting these errors.

In a further step 440, the adapted neural network can be made available for third parties, can be applied on an apparatus, the apparatus being related to the optical system, or can be stored in a cloud, on a server, or in any other data memory.

Various optical aberrations that are related to the production and functionality of optical systems can be corrected with the aid of machine learning (ML) processes. The described ML processes comprise algorithms with which machines can learn from experience and may arise from so-called "deep learning" (DL), a certain type of neural network. An effective correction of aberrations facilitates a more cost-effective production of powerful objectives since aberrations of objectives with significantly larger artifacts, in particular greater variations between individual examples of the same production series, can be corrected. Firstly, this can compensate for the tolerances between objectives by virtue of admitting a greater variation in the tolerances. Moreover, corresponding objectives can also be constructed in such a way that their imaging quality on the optical axis is optimized. The optical correction at the image field edge need not be so high, as this can be corrected by the neural networks. By way of example, aberrations can also be assessed during the construction of the objectives in relation to how complex the correction is by means of the objective or software post-processing (application of the neural network). Errors that can be corrected particularly easily by means of the ML/DL network can be less prioritized in the construction/conception of the objective.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 110, 120, 140 Training steps
112 Method step
114, 128, 144 Data memory
116, 130, 150 Neural network
122, 124 Method steps
126 Image pairs
136 Loss function
142 Method step
152 Optical system
154 Label
156 Individual training data
200 Neural network
210 Image with optical aberrations
220 Corrected image
300 Apparatus
310 Processor
320 Storage medium
330 Neural network
340 Components
400 Method
410-440 Method steps

The invention claimed is:

1. A method for determining a neural network for correcting optical aberrations, the method comprising:
determining one or more images, wherein the one or more images are at least partly related to an optical system or the design of an optical system; and
determining a first neural network on the basis of the determined one or more images in such a way that the determined first neural network when applied to an image captured by the optical system outputs an image which has been corrected in relation to one or more optical aberrations,
wherein determining the first neural network comprises training the first neural network by applying a second neural network as a loss function, and wherein the loss function defines a feature restoration loss indicative of a measure of differences in image content between a target output image and an output image of the first neural network.

2. The method as claimed in claim 1, wherein determining the one or more images comprises determining training images which comprise a multiplicity of image pairs, and
wherein training the first neural network comprises training using the training images, wherein each image pair of the multiplicity of image pairs respectively comprises an input image for the first neural network and the target output image.

3. The method as claimed in claim 2, wherein the training images are generated from captured images, wherein the captured images were captured by means of one or more optical systems and/or using the optical system, and
wherein none, a subset, or all of the one or more optical systems have the same design as the optical system, and/or
wherein the captured images image one or more sample types.

4. The method as claimed in claim 2, wherein the training images are generated by a simulation of optical aberrations.

5. The method as claimed in claim 2, further comprising determining at least one optical transfer function (OTF) or at least one point spread function (PSF) for the optical system or for optical systems which are at least partly of a same type as the optical system, wherein input images of the multiplicity of image pairs are generated by convolving aberration-free images with one of the at least one PSF, and wherein the aberration-free images are used as corresponding target output images of the multiplicity of image pairs.

6. The method as claimed in claim 2, wherein training the first neural network comprises training using the training images and further data, wherein the further data comprise at least one of the following: parameter data which are related to the training images, validation data, measurement data related to a production of the optical system, data relating to the progress of an experiment or a measurement, information relating to reagents and materials, information relating to an object or sample, information relating to the optical system, user-related data, user inputs, and information relating to an image capture system.

7. The method as claimed in claim 1, wherein the method further comprises the step of finely adjusting the determined first neural network.

8. The method as claimed in claim 7, wherein finely adjusting comprises training only part of the determined first neural network, wherein one or more parameters of the determined first neural network remain unchangeable during the fine adjustment, and/or
wherein the fine adjustment comprises training specific to the optical system, and/or
the finely adjusted first neural network can be uniquely assigned to the optical system.

9. The method as claimed in claim 7, further comprising generating individual training data for the fine adjustment, wherein generating the individual training data comprises determining optical properties of the optical system and/or capturing measurement samples by the optical system, wherein the individual training data are generated on the basis of the optical properties and/or the measurement samples.

10. The method as claimed in claim 9, wherein:
the measurement samples, the optical properties, and/or the individual training data are stored, and/or
the measurement samples, the optical properties, and/or the individual training data are uniquely assigned to the optical system.

11. The method as claimed in claim 1, wherein the optical system is uniquely and/or automatically identifiable, and/or
the first neural network can be uniquely assigned to the optical system.

12. The method as claimed in claim 11, wherein the optical system is identifiable by means of electromagnetic identification, optical identification, mechanical identification, or magnetic identification.

13. The method as claimed in claim 1, further comprising applying the determined first neural network to captured data, wherein the captured data were captured by the optical system or an optical system of a same type.

14. The method as claimed in claim 1, wherein the one or more optical aberrations comprise at least one of the following optical operations: astigmatism, vignetting, coma, chromatic aberration, spherical aberration, and defocusing.

15. The method as claimed in claim 1, wherein training the first neural network is performed on the basis of the one or more images, wherein the first neural network learns during the training how objects and/or structures in the one or more images ideally look and corrects deviations therefrom.

16. The method as claimed in claim 1, wherein the optical system is part of an imaging and/or image recording system of a microscope, of a microscope system, of a camera, of a smartphone, of a telescope, of a mobile computer, of a stationary computer or of a measuring appliance.

17. An apparatus for correcting optical aberrations, the apparatus comprising:
one or more processors;
one or more computer-readable storage media on which computer-executable instructions are stored, the instructions, when executed by the one or more processors, cause:
one or more images to be captured by an imaging and/or image recording system, wherein one or more optical aberrations in the one or more captured images are related to at least one part of the imaging and/or image recording system;
a first neural network to be applied to the one or more captured images, wherein the neural network is configured to generate one or more corrected images from the one or more captured images, in such a way that the one or more optical aberrations are corrected or reduced in the one or more corrected images, and
a second neural network configured to be applied as a loss function for training the first neural network, wherein the loss function defines a feature restoration loss indicative of a measure of differences in image content between a target output image and an output image of the first neural network.

18. The apparatus as claimed in claim 17, wherein the one or more captured images are stored and the first neural network is applied to the one or more stored captured images, or
wherein the first neural network is applied directly to the one or more captured images and only the one or more corrected images are stored.

19. The apparatus as claimed in claim 17, wherein the at least one part of the imaging and/or image recording system comprises an optical system, a photographic layer, a scientific complimentary metal-oxide-semiconductor (sCMOS) or charge-coupled device (CCD) sensor, or one or more diffusers.

20. A tangible, non-transitory computer-readable medium containing computer program comprising commands which when the computer program is executed by one or more processors cause the one or more processors to carry out the method as claimed in claim 1.

21. The method as claimed in claim 1, wherein the second neural network is not trained or altered during the training of the first neural network.

22. The apparatus as claimed in claim 17, wherein the second neural network is not trained or altered during the training of the first neural network.

* * * * *